UNITED STATES PATENT OFFICE.

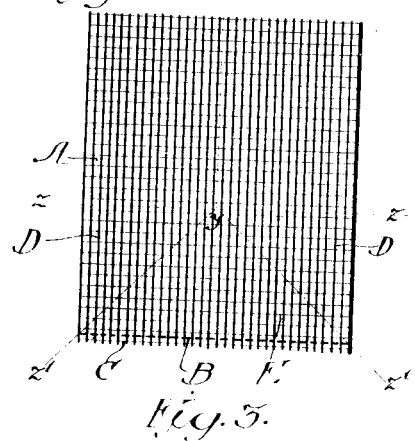
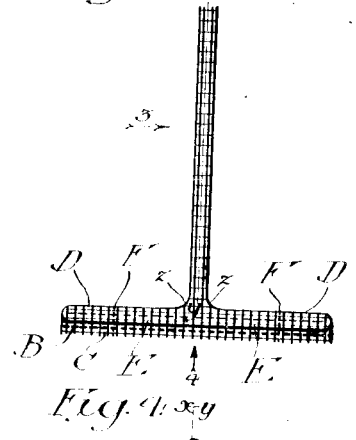
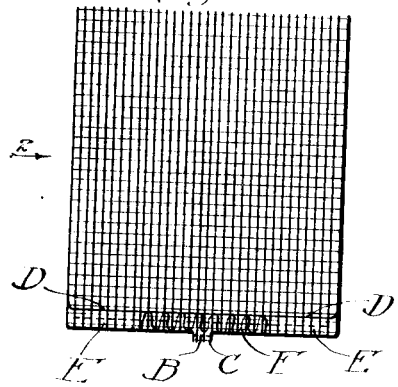
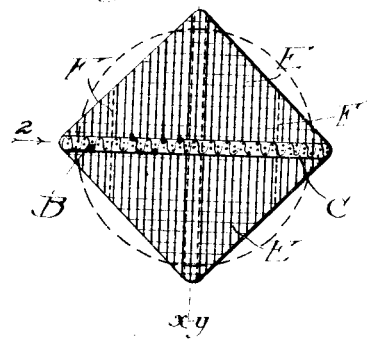
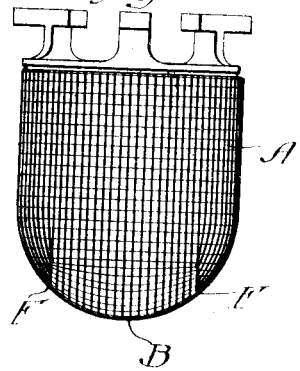
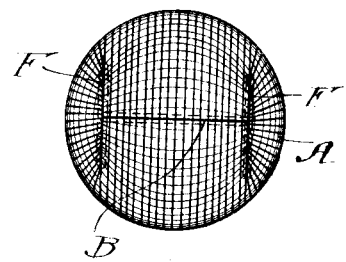

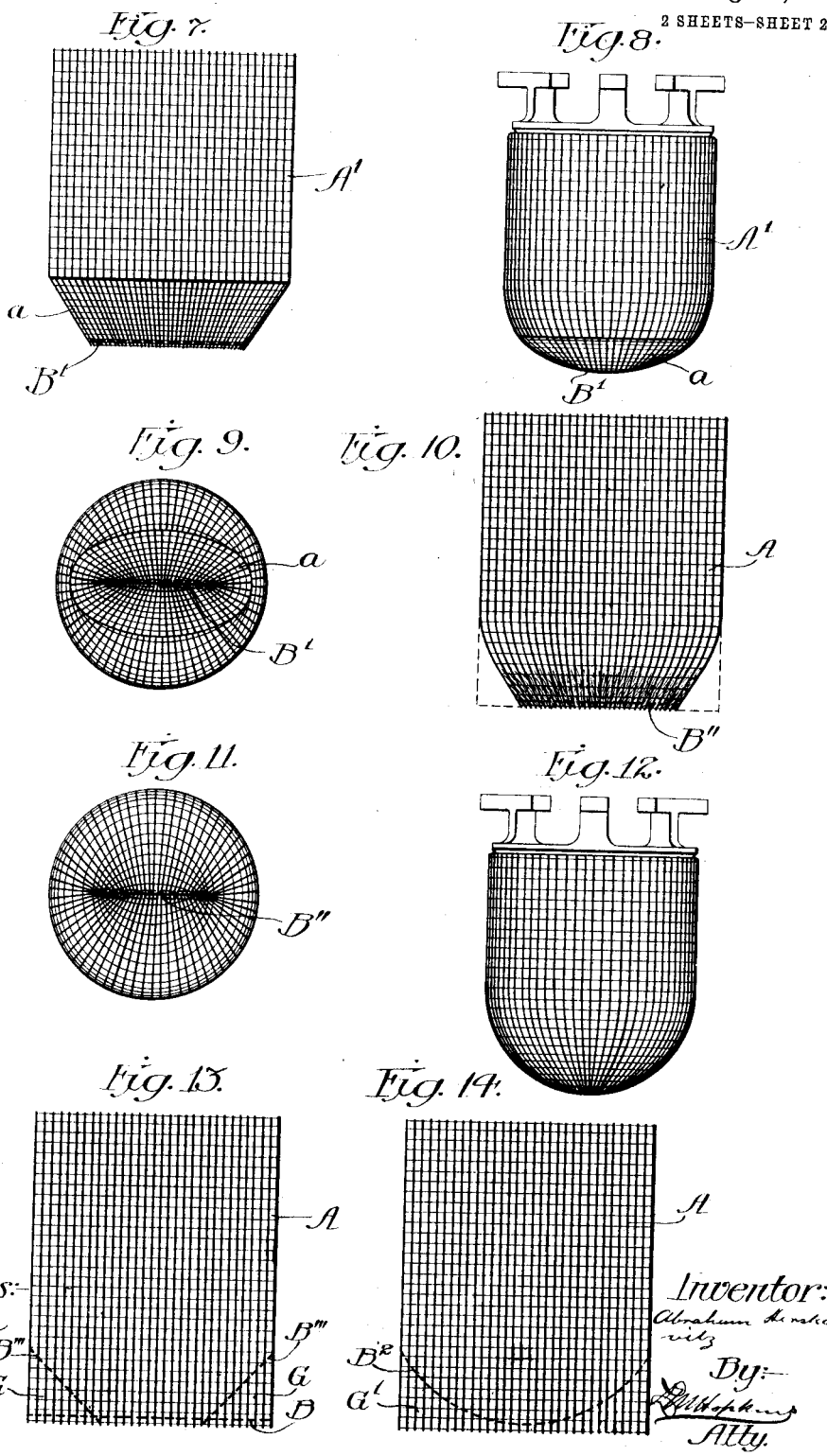

ABRAHAM HERSKOVITZ, OF CHICAGO, ILLINOIS.

INCANDESCENT MANTLE.

1,107,518. Specification of Letters Patent. Patented Aug. 18, 1914.

Application filed December 27, 1909. Serial No. 535,140.

*To all whom it may concern:*

Be it known that I, ABRAHAM HERSKOVITZ, a citizen of the United States, residing at Chicago, in the county of Cook and State of Illinois, have invented certain new and useful Improvements in Incandescent Mantles, of which the following is a specification.

This invention relates more particularly to that class of incandescent mantles which are especially adapted for use on inverted gas burners, a distinguishing characteristic of which is that the mantle has a closed end or terminal which is rounded or dome-shaped, the shape preferably approximating, as closely as possible, a hemisphere, but precision in this respect is not essential as the functional requirements of the mantle will be met by any form having a substantially smooth convex surface.

The object of the invention is to provide a mantle of this class of improved construction and while some of the important advantages of the invention manifest themselves in the low cost of manufacture, incident to facilitating the method or process of manufacture and minimizing waste, still others are inherent in the completed mantle itself. All of the advantages of the invention may be best set forth by a description which includes the several steps in the method or process of manufacture as well as the several characteristics of the completed mantle which result from carrying out said method or process. Incandescent mantles of the class mentioned are usually made of loosely woven textile fabric and the first step in the process of manufacture is the forming of a tube of this fabric. This tube may be formed by stitching together the edges of a strip or comparatively long and narrow sheet of such fabric, which has been first woven in the flat, or it may be made by weaving or knitting the fabric in the form of a tube, in the first instance. This is a detail which is immaterial so far as the present invention is concerned, the essential feature in this respect being the provision of a tube of loosely woven textile fabric. Nor is it essential by what method or process the fabric is made, the term "woven" being herein used in a generic sense and intended to comprehend any loose or open mesh fabric, whether made by weaving, knitting, or otherwise. The characteristic intended to be included by the expression "loosely woven" is that the fabric shall have the property of expansibility or extensibility in order that it may stretch or give more or less, and conform to a pattern or former of the shape which it is desired to give to the closed end or terminal of the mantle.

The invention consists in the several features of novelty that are hereinafter described with reference to the accompanying drawings, which are made a part of this specification and which show mantles of several specific forms, all embodying the generic invention.

In the drawings Figure 1 is a diagrammatic view showing a length of the tubing of which one species or form of mantle embodying the generic features of the invention is made after a step in shaping the tube in the process of forming the mantle has been taken. Figs. 2 to 4 inclusive are views thereof showing it at several different stages during the forming process, the views being taken from different positions. Figs. 5 and 6 are, respectively, a side view and an end view of a completed mantle made by following the forming process illustrated in Figs. 1 to 4, inclusive, and which, for the purpose of this application, is elected as the preferred form of the invention. Fig. 7 is a diagrammatic view of a length of the tubing of slightly modified form after a subsequent step in the forming of a mantle therefrom has taken place. Figs. 8 and 9, are, respectively, a side view and an end view of a completed mantle made thereof. Fig. 10 is a diagrammatic view of a length of tubing similar to that shown in Fig. 1 after a subsequent step in the process of forming the mantle has been taken. Figs. 11 and 12, are, respectively, a side view and an end view of a completed mantle made thereof. Figs. 13 and 14 are diagrammatic views of lengths of tubing similar to that shown in Fig. 1 after some of the subsequent steps of somewhat modified character have been taken in the process of forming mantles thereof.

Adopting the terms from the art of weaving, those threads—or rather those portions of the threads—which extend parallel or substantially parallel with the axis of the tubing or in the general direction of its length, before the process of forming and shaping it into the form of a mantle is begun, are herein called the warp, by whatever process the fabric is made, while those that extend transversely of the warp are herein called the woof.

The stitches, or loops, or thread-formation of the fabric is not shown accurately and in detail by the drawings but only diagrammatically, by straight lines,—the warp by the heavy lines which are parallel with or in the general longitudinal direction of the axis of the tube, and the woof by the lighter transverse lines.

Referring first to Figs. 1 to 6 inclusive, A represents an integral blank, or length of tubing which is flattened out, or folded upon a longitudinal plane of its axis. Its opposite sides are then united face to face by a seam B formed by a continuous row of stitches which pass completely through both layers of the fabric, said seam extending across the tube at right angles to the warp and located a sufficient distance from one end of the tube to cause the stitches to firmly take hold of all the warp threads, leaving short raw edges, C, which may be trimmed off if necessary. This completely closes one end of the tube. The tube is then folded longitudinally upon an axial plane which is perpendicular to the plane first aforesaid, as indicated by the dotted line $x$—$y$, and also transversely upon the straight line $z$—$z$ and upon angular lines $z'$—$y$—$z'$, bringing the tube to the shape or condition shown in Figs. 2, 3 and 4. That is to say, the sides of the main portion of the tube, above the intersection of the line $x$—$y$ with the line $z$—$z$ lie flat against each other, and upon opposite sides of the axial plane $x$—$y$ as shown more clearly in Fig. 2. It will also bring those portions, D, of the tube which are bounded by the lines $z$—$y$—$z'$ into a plane which is perpendicular to the axis of the tube and those portions, E, of the tube which are below the lines $z'$—$y$—$z'$ and below the line $z$—$z$ to positions parallel with and flat against the portions, D. The relative positions of the several parts, after these steps are taken, are such that they will present the appearance of the letter T, as shown in Fig. 2 when viewed in the direction of the arrow, 2, in Figs. 3 and 4, and the appearance shown in Fig. 3 when viewed in the direction of the arrow, 3, in Fig. 2 and the appearance of a square, as shown in Fig. 4, when viewed in the direction of the arrow, 4, Fig. 2. The overlapping portions, D and E, are then united by two parallel rows of stitches, forming seams, F, which are perpendicular to the seam, B, and are located equidistant from the axial plane $x$—$y$ of the tube and at such distance apart as to contract the closed end of the tube to the desired extent. It will be observed that the seam, B, is exactly at right angles to all of the warp threads intersecting it so that said intersecting warp threads are all connected and held with such firmness that they cannot be pulled out or the fabric be stretched or distended in the line of the warp, thus making the structure stronger and more durable than would be the case if the seams were oblique to the warp. It will be observed also that the seams, F, are at right angles to the intersecting warp threads of the portions, D, while they are parallel with said threads of the portions, E, so that, notwithstanding this last-named condition, each and every one of the warp threads is caught and held by the stitches of the seams. I desire to have it understood however, that while the right angular relations of the seams and the warp threads are preferable, still some features of the invention may be availed of in a structure in which the seams are oblique to the warp, as will hereinafter appear in the description of some of the species shown in the drawings. After the tube has been thus folded and stitched the surplus material outside of the several seams is trimmed off and the material thus trimmed off represents the only loss of material. Stating this matter differently and more tersely, the tube is folded on one of its axial planes, $x$—$y$, one of its ends is closed by the seam, B, which lies in a plane that is perpendicular to the axial plane aforesaid, each half of the closed end of the tube is then folded upon a plane which is perpendicular to the aforesaid plane, in which the seam, B, lies, and then uniting the opposite folds of each of the folded halves by a seam which lies in a plane that is perpendicular to the plane in which the seam, B, lies. When thus stitched and without any further treatment of any kind, (with the exception of trimming and turning it inside out if it be found necessary or desirable to do either), the result of the preceding steps is a complete "rag mantle", as it is known to the trade. In use, a rag mantle is not "shaped", technically so called, before it as applied to the burner. It is intended for use on burners which are supplied with gas under a comparatively high pressure so that when the gas enters the mantle in its deflated condition it will distend it and when ignited it will become highly incandescent so that it will easily yield to the gas pressure within it and naturally and automatically assume the proper shape, which is dome-like. When intended for use in connection with low pressure gas the mantle is shaped before it is sent out to be placed upon the burner.

In shaping a mantle made as above described it is stretched over a pattern or former, the main body portion of which is preferably cylindrical and of greater diameter than the length of the rows of stitches, F, and the length of what remains of the row of stitches, B, as indicated by the dotted circle in Fig. 4, and the end of this pattern or former is of the rounded or convex shape, which it is desired to give to the terminal of the completed mantle, as shown in Figs. 5 and 6. In assuming this shape the fabric is not materially stretched or distended in the lines of the warp but it is more or less stretched or distended in the line of the woof and especially at those portions where the rows of stitches, F, cross the warp, so that the closed end or terminal of the completed mantle will have the appearance shown in Figs. 5 and 6, the three seams B, F and F, appearing in the form of the letter I—or H, depending upon the position in which it occupies when viewed. It will be understood that either before or after the fabric is placed on the former it is saturated with a proper solution and after it dries the mantle will retain its shape and may be removed from the former, in readiness for use.

In making a mantle of the form shown in Figs. 8 and 9, a section of tubing, or a blank such as is shown at A' in Fig. 7 is used. This blank differs from the blank, A, shown in Fig. 1, in that the end of the tube is contracted as shown at a during the process of its manufacture. If made upon a circular knitting machine the contraction is produced by tightening the stitch in the manner which is well known in the art of knitting. The contracted end of the tube is then closed by a single row of stitches, forming a seam, B.

The mantle shown in Fig. 12 is made from a tube or blank, A, which is precisely like that shown in Fig. 1 and its end is closed by a single row of stitches forming a seam, B, which extends across the tube at right angles to its axis, in the manner described with reference to Fig. 1, excepting that the fabric is gathered while it is being stitched and this gathering of the fabric results in contracting the end of the tube so that it will have somewhat the appearance of the tube A' shown in Fig. 7.

Figs. 13 and 14 show, diagrammatically, blanks which are precisely like that shown in Fig. 1. As shown in Fig. 13 the contacting opposite sides of the blank are seamed together by a row of stitches B and two diagonal rows of stitches B'''. Preferably the row of stitches B is made first and the diagonal rows made afterward but it is manifest that this order is immaterial. After the two sides of the blank are thus seamed together the portions, G, lying outside of the diagonal seams and the portion lying outside of the seam B are trimmed off, if necessary or desired, and the mantle is then in readiness for shaping, either automatically by the pressure of the gas within it, or by a separate shaping process, a number of which processes are known to those skilled in the art. It is manifest that instead of seaming the sides of the blanks together by running three separate rows of stitches, successively, as separate operations, the seaming may be done at a single operation, commencing at the outer end of one of the two diagonal lines B''' and proceeding thence along said line to its intersection with the line B, thence along said line to its intersection with the other diagonal line and thence along the latter to its outer end, after the manner of single curved row of stitches, B², as shown in Fig. 14.

In all of the several forms of the invention the blank is severed, or at any rate, it terminates upon a continuous transverse line the course of which has no direct controlling relation to the ultimate shape which the closed end of the mantle is to have, and it is closed by seaming its opposite sides together by a continuous row or rows of stitches which pass through them. The ultimate shape of its closed end, after it has been subjected to the shaping process, is determined by the course of the closing seam.

In all of the several forms the entire closed end of the mantle is made integral with the sides thereof which is due to the fact that the warp threads of the fabric are continuous, and in this the improved mantle is distinguishable from a mantle the closed end or dome of which is formed, at least in part, of a separate piece of fabric inserted and stitched to another piece which forms the body of the mantle.

In all of the several forms of the invention, starting with that stage in the process of manufacture at which there is a tube having a contracted end, the closing of the contracted end is accomplished by a single seam extending transversely from side to side of the then open end of the mantle, transversely of the warp threads, said seam being made of stitches which pass completely through the opposite contacting sides of the tube and securing them together, face to face.

In all of the several forms of the invention each and every warp thread which intersects the closing seam is crossed by it transversely so as to be caught and firmly held by the stitches of which the closing seam is made: in the form shown in Figs. 1 to 6, inclusive said closing seam intersects all of the warp threads at right angles and in the forms shown in Figs. 7 to 12, inclusive, it intersects some of them at right angles and others at an abrupt angle. In the forms shown in Figs. 1 to 6, inclusive, all of the warp threads that are intersected by the contracting seams are intersected at right angles. In every instance where a warp thread is intersected by a seam it is either at right angles or an abrupt angle whereby said threads are firmly caught and held.

In the preferred form of the invention the contracting seams lie in planes which chord the completed mantle while the closing seam lies in an axial plane of the mantle and intersects the closing seams centrally and at right angles, thus presenting the appearance of the letter I or the letter H, according to the relative lengths of the seams.

I do not claim in this application a mantle which, when distended, has a tubular body portion and a closed end or terminal of dome-shape, said mantle being made of a single integral tube of fabric contracted at one end and folded upon an axial plane of the tube so that its folds on opposite sides of said plane lie face to face and contact with each other, and a closing seam consisting of stitches passing completely through both folds at the contracted end, said seam being transverse to the warp threads of the tube, this being made the subject matter of my companion application of even date herewith, Serial No. 535,141.

What I claim as new and desire to secure by Letters Patent is:

1. An incandescent mantle, made of fabric, having a tubular body portion and a closed end or terminal of dome-shaped, the warp threads being parallel with the axis of the tubular body portion and crossed and caught at the terminal or dome-shaped portion by the stitches of a continuous seam, which is less in length than the diameter of the tubular portion, when distended cylindrically, and which seam lies in a diametrical plane of said tubular portion, when distended cylindrically, and extends equal distances from the axis of the dome-shaped portion.

2. An incandescent mantle, made of fabric, and having a distended tubular body portion and a distended dome-shaped end or terminal closing it at one end, said dome-shaped terminal having three seams arranged in the form of the letter H, all of which seams are less in length than the diameter of the distended tubular body portion, that seam which connects the other two at their mid-length to form the letter H being arranged in a diametrical plane of the tubular body portion and extending continuously in opposite directions from the axis thereof, each of the warp threads being caught and crossed at right angles by the seam which it intersects.

ABRAHAM HERSKOVITZ.

Witnesses:
 MABEL E. MADER,
 LILLIE M. CATELLIER.